US009367610B2

(12) United States Patent (10) Patent No.: US 9,367,610 B2
Damodaran et al. (45) Date of Patent: Jun. 14, 2016

(54) KNOWLEDGE REGISTRY SYSTEMS AND METHODS

(71) Applicant: MASSACHUSETTS INSTITUTE OF TECHNOLOGY, Cambridge, MA (US)

(72) Inventors: Suresh K. Damodaran, Acton, MA (US); Benjamin D. O'Gwynn, Newton, MA (US); Tamara H. Yu, Lexington, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 135 days.

(21) Appl. No.: 14/157,174

(22) Filed: Jan. 16, 2014

(65) Prior Publication Data

US 2015/0199424 A1 Jul. 16, 2015

(51) Int. Cl.
*G06F 17/30* (2006.01)

(52) U.S. Cl.
CPC .......... *G06F 17/30734* (2013.01); *G06F 17/30* (2013.01); *G06F 17/30563* (2013.01); *G06F 17/30569* (2013.01); *G06F 17/30675* (2013.01)

(58) Field of Classification Search
CPC ................ G06F 17/30734; G06F 17/30675; G06F 17/30; G06F 17/30563; G06F 17/30569
USPC ................ 707/756, 602, 706, 778, 999.002, 707/999.005, 999.102, E17.014; 365/189.05, 194, 230.06, 230.08
See application file for complete search history.

(56) References Cited

U.S. PATENT DOCUMENTS

| | | | |
|---|---|---|---|
| 6,609,123 B1 * | 8/2003 | Cazemier | G06F 17/30607 |
| 8,566,347 B1 * | 10/2013 | Patil | G06F 17/30342 707/769 |
| 2004/0015814 A1 * | 1/2004 | Trappen | G06F 17/30607 717/100 |
| 2005/0022114 A1 * | 1/2005 | Shanahan | G06F 21/10 715/234 |
| 2005/0120021 A1 * | 6/2005 | Tang | G06Q 30/02 |
| 2006/0248045 A1 * | 11/2006 | Toledano | G06F 17/30463 |
| 2007/0208726 A1 * | 9/2007 | Krishnaprasad | G06F 17/30663 |
| 2010/0185643 A1 * | 7/2010 | Rao | G06F 17/30389 707/759 |
| 2012/0284259 A1 * | 11/2012 | Jehuda | G06F 17/30734 707/722 |
| 2014/0059017 A1 * | 2/2014 | Chaney | G06F 17/30595 707/692 |
| 2014/0200989 A1 * | 7/2014 | Cohen Kassko | G06Q 30/0243 705/14.42 |
| 2014/0258212 A1 * | 9/2014 | Kunert | G06F 17/30477 707/607 |
| 2014/0310302 A1 * | 10/2014 | Wu | G06F 17/30442 707/769 |

OTHER PUBLICATIONS

Das et al, "Supporting Ontology-based Semantic Matching in RDBMS", Proceedings of the 30th VLDB Conference, Toronto, Canada, 2004, pp. 1054-1065.*

(Continued)

*Primary Examiner* — Tony Mahmoudi
*Assistant Examiner* — Kamal Dewan
(74) *Attorney, Agent, or Firm* — Daly, Crowley, Mofford & Durkee, LLP

(57) ABSTRACT

Systems and methods are disclosed that provide high-level, ontology-based analysis of low-level data stored within an unstructured key/value store. The systems and methods allow an analyst to make sense of massive amounts of data from diverse sources without having any knowledge of the underlying physical data storage. Additional features include feasibility queries to determine if requested data exists in the key/value store before performing an expensive query; automatic query optimization using secondary indexes; and a usage history service to identify performance bottlenecks and fine tune the storage schema.

19 Claims, 6 Drawing Sheets

(56) References Cited

OTHER PUBLICATIONS

Damodaran et al., "Method and Systems for Enhanced Ontology Assisting Querying of Data Stores;" Filed Nov. 18, 2014 corresponding to U.S. Appl. No. 14/546,355; 56 Pages.

Ghazal et al., "BigBench: Towards an Industry Standard Benchmark for Big Data Analytics", SIGMOD '13 Jun. 22-27, 2013, New York, New York, USA, 12 pages.

Hruschka Jr., et al., "Integrated Computing Technology", First International Conference, INTECH 2011 Sao Carlos, Brazil, May 31-Jun. 2, 2011 Proceedings, 183 pages.

Gao, Jing, "Exploring the Power of Heterogeneous Information Sources", Dissertation, submitted to Graduate College of the University of Illinois at Urbana-Champaign, 2011, 194 pages.

Sukumar et al., "Concept of Operations for Knowledge Discovery from "Big Data" Across Enterprise Data Warehouses", 2013, Computational Sciences and Engineering Division, Oak Ridge National Laboratory, Oak Ridge, TN, 9 pages.

Morshed et al., "Recommending Environmental Knowledge as Linked Open Data Cloud Using Semantic Machine Learning", ICDE Workshops 2013, 2 pages.

Larsen, Dr. Tulinda, "Cross-Platform Aviation Analytics Using Big-Data Integration Methods", 2013 Integrated Communications Navigation and Surveillance (ICNS) Conference, Apr. 25, 2013, 20 pages.

Larsen, Dr. Tulinda, "Cross-Platform Aviation Analytics Using Big-Data Methods", masFlight, Bethesda, MD, 2013, 9 pages.

* cited by examiner

KNOWLEDGE REGISTRY SYSTEMS AND METHODS

STATEMENT REGARDING FEDERALLY SPONSORED RESEARCH

This invention was made with Government support under Grant No. FA8721-05-C-0002 awarded by the U.S. Air Force. The Government has certain rights in the invention.

CROSS REFERENCE TO RELATED APPLICATIONS

Not Applicable.

BACKGROUND

As is known in the art, many organizations, including private and public businesses as well as government agencies have a need to conduct real-time, ontology-based analysis of massive amounts of data collected from diverse sources. For example, a cyber security expert may be tasked with making sense of billions of network events generated by millions of unique users. Such data may be logged by many different network proxies, web servers, Dynamic Host Configuration Protocol (DHCP), and user authentication systems, each having a different log format.

As is also known, modern unstructured key/value stores (i.e. so-called "Big Data" databases) are well suited to storing massive amounts from diverse data sources. Key/value stores are generally more flexible compared to traditional databases (e.g. SQL databases) because they generally do not impose a schema or other constraints on the data stored therein. A single table within a key/value can store data from multiple data sources that use disparate naming conventions and data formats. Further, key/value stores generally provide better write/read performance and scalability compared with traditional databases.

SUMMARY

It has been appreciated herein that although unstructured key/value stores are well-suited for storing massive amounts of data from various data sources, it is difficult to perform high-level analysis on data stored therein.

In accordance with the concepts sought to be protected herein, a method includes storing one or more ontology entities associated with an ontology and one or more table definitions in a memory. Each table definition comprises a mapping between one or more of the ontology entities and one or more database column identifiers. The method also includes storing one or more data collection records, each data collection record associated with one of the stored table definitions, each data collection record comprising one or more database row identifiers, each row having one or more columns corresponding, each row column corresponding to one of the table definition columns.

In accordance with one aspect, the method further includes receiving a request, the request identifying one or more of the stored ontology entities; identifying at least one table definition, from the memory, associated with the identified ontology entities; selecting one or more data collection records, from the memory, associated with the identified table definition; and returning a response, the response including the identified table definition mapping and the database row identifiers from the selected data collection records.

With this particular arrangement a method for providing high-level, ontology-based query capabilities for use with an unstructured key/value store is provided.

In one aspect, the request further comprises at least one operator name and the method further comprises: storing, in the memory, one or more operator records, each operator record having an name and being associated with one or more of the stored ontology entities; and determining if a matching operator record exists in the memory, the matching operator record having a name matching the operator name and being associated with the identified ontology entities, wherein the response indicates the existence of the matching operator record.

In some aspects, at least one of the database row identifiers comprises a first timestamp and a second timestamp, and wherein the request further comprises a time range, the method further comprising filtering the selected data collection records based upon the time range and the data collection row identifier timestamps. In one aspect, at least one of the table definitions includes one or more secondary indexes, wherein the response further includes any secondary indexes included within the identified table definition.

In accordance with one aspect, the method further comprise one or more of the following: storing, in the memory, a usage history record associated with the matching operator record, the usage history record comprising a timestamp generally indicating the time required to perform processing associated with the identified operator; identifying, from among the stored operator records, at least two operator records associated with the identified ontology entities; and selecting one of the two identified operator records based upon associated usage history records.

In some aspects, the method further comprises retrieving one or more data records from a database, wherein the location of the data records in the database is based upon the table definition mapping and the database row identifiers included within the response. In one aspect, the database comprises a key/value store. In some aspects, the database comprises event data and the request further comprises an event type.

Also in accordance with the concepts sought to be protected herein, a system includes a memory, a content model update service, and a data store state update service to perform the method.

BRIEF DESCRIPTION OF THE DRAWINGS

Various embodiments of the systems and methods sought to be protected herein may be more fully understood from the following detailed description of the drawings, in which.

DETAILED DESCRIPTION

Figure 1:
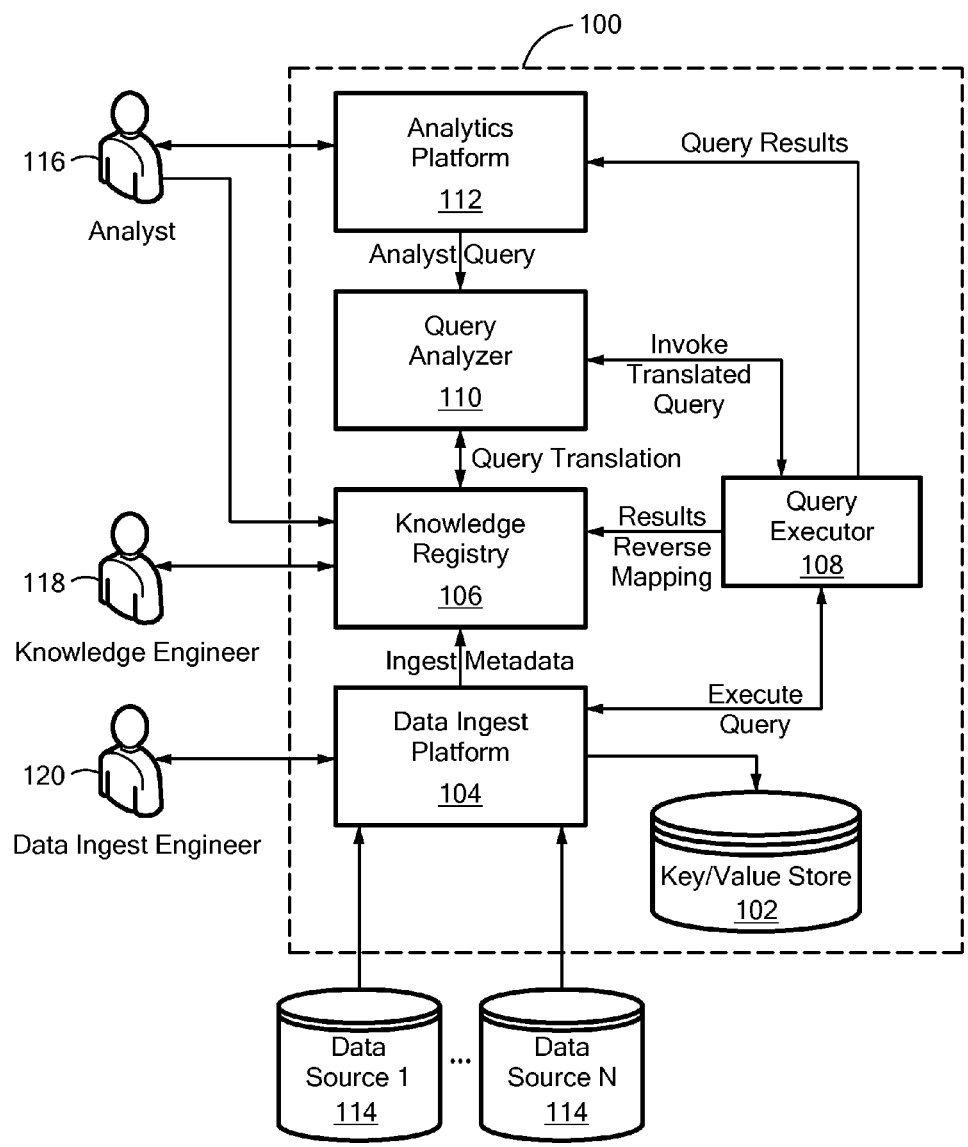
FIG. 1 is a block diagram of an exemplary analytics system that includes a knowledge registry.

Before describing exemplary embodiments of the systems and methods used to teach the broad concepts sought to be protected herein, some introductory concepts and terminology used in conjunction with the exemplary embodiments are explained. As used herein, the terms "data record" and "record" are used to describe a set of attributes, each attribute having a value and a corresponding identifier (sometimes referred to as the attribute "name"). The terms "data record collection" and "data collection" are used to describe a group of one or more related data records. As used herein, the term "soft deleted" refers to a data record stored within a system that is hidden from the system users but is not physically deleted from the system.

The term "analyst" is used herein to refer to any person or system capable of using the analytics systems and methods described herein to obtain high-level analytics information, including but not limited to humans and intelligent machines (e.g. machines having neural-network capability). The term "engineer" is used herein to refer to any person or system capable of configuring, maintaining, or operating the systems described herein.

The term "dimension" is used to describe a normalized, opaque data type for use within the present systems and methods. The term "dimension set" is used herein to describe a group of related dimensions. In one respect, dimensions and dimension sets are entities included within an ontology (i.e. "ontology entities"). For example, in the cyber security domain, an ontology may include the dimensions "IPAddress", "Client:IPAddress", "DomainName", "Server:DomainName", and "Time", each of which is included within the dimension set "WebRequest".

Reference will sometimes be made herein to the Knowledge Query Language (KQL) and KQL queries. KQL is an ontology-based, domain-specific, structured query language designed for use in the present systems and methods.

In general, a KQL query includes a dimension set ("DIMENSION_SET") and one or more operations ("OPERATIONS"), each operation including a query operator ("OPERATOR"), an input section ("INPUT"), and an output section ("OUTPUT"). The query operators are identifiers (e.g. strings) which correspond to opaque operations implemented by the systems described herein. Although the present systems are not limited to any specific KQL query operators, four operators are discussed herein for explanatory purposes, including SELECT, DISTINCT, COUNT, and DIFF, each of which is described further below in conjunction with TABLE 2.

The input and output sections can include a dimension identifier ("DIMENSION") and a corresponding constraint value ("VALUE"). The constraint value may include, but is not limited to, a scalar (e.g. "google.com"), a range (e.g. "201208110300,201208120300"), and/or commonly used relational operators (e.g. "<", ">", "=", "<=", ">="). For an input section, the dimension identifier specifies the type of data which the corresponding operator expects to receive as input. For an output section, the dimension identifier specifies the type of data that should be output by the corresponding operation. As a special case, the dimension identifier "ALL_DIMENSIONS" may be used within the output section to indicate all available dimensions should be included within the corresponding output result data. In one embodiment, the specified input and output dimension identifiers must be included within the specified identified dimension set.

An exemplary KQL query for use in cyber security applications is shown in TABLE 1 and will now be discussed. This query, which is shown encoded as JSON, may be issued by an analyst to obtain a distinct collection of client IP addresses that have made web requests to a web server having the domain "google.com". It should be appreciated that KQL queries can be encoding using other suitable encoding techniques, including XML.

The query in TABLE 1 includes two operators having respective operator names "DISTINCT" and "SELECT". The operators are to be executed sequentially, in reverse order. The first operator ("SELECT") selects all available web request data in the given time period, where the corresponding web requested either originated from or was sent to a web server with a domain matching "google.com". The second operator ("DISTICT") computes the set of distinct IP addresses among the data returned by the first operator.

TABLE 1

{"OPERATIONS": [{"OPERATOR": "DISTINCT",
    "INPUT": [{"DIMENSION": "Client:IPAddress"}],
    "OUTPUT": [{"DIMENSION": "Client:IPAddress"}]},
    {"OPERATOR": "SELECT",
    "INPUT": [{"DIMENSION": "Server:DomainName",
        "VALUE": "google.com"},
    {"DIMENSION": "Time",
        "VALUE": "201208110300,201208120300"}],
    "OUTPUT": [{"DIMENSION": "ALL_DIMENSIONS"}]}],
"DIMENSION_SET": "WebRequest"}

Various exemplary embodiments are discussed hereinbelow making use of KQL. It is envisioned, however, that the broad concepts described herein are equally applicable to other query languages and that the concepts described herein are not limited to any particular query language.

FIG. 1 shows an exemplary analytics system 100, which includes: a key/value store 102, a data ingest platform 104, a knowledge registry 106, a query executor 108, a query analyzer 110, and an analytics platform 112. The analytics system 100 generally receives data from one or more data sources 114 and provides real-time, ontology-based query capabilities to an analyst 116. The data sources 114 can log files from a various third-party systems, including but not limited to network proxies, web servers, Dynamic Host Configuration Protocol (DHCP) servers, and user authentication systems. As will be apparent from the description that follows, the system 100 provides a complete layer of abstraction between the unstructured key/value store 102 and the analytics platform 112. Thus, the analyst 116 need not be concerned with the format or structure of the key/value store data, and can instead can focus on making sense of the that data.

Each of the system components 104-112 may include hardware and/or software components used to implement the respective functionality described hereinbelow. The components 104-112 may be coupled together as shown in FIG. 1. Each connection may be provided as a hardware-based connection, a software-based connection, or a connection provided from a combination of both hardware and software. Thus, it should be appreciated by those skilled in the art that the system 100 could be implemented entirely within a single computing device or distributed among a plurality of networked computing devices, the computing devices being either virtual machines or hardware-based devices. It should further be appreciated that the components 102-112 illustrated in FIG. 1 may also be coupled in configurations other than shown in FIG. 1. One of ordinary skill in the art, after the reading the disclosure provided herein will appreciate that a wide variety of different configurations may be used.

The data ingest platform 104 (also referred to herein as the "ingest platform") may be coupled to the data sources 114, the key/value store 102, the knowledge registry 106, and the query executor 108, as shown in exemplary embodiment of FIG. 1. In other embodiments, the query executor 108 and/or query analyzer 110 may be included within the ingest platform 104. A data ingest engineer 120 can manually operate the ingest platform 104 and/or configure the platform for generally autonomous operation.

In operation, the ingest platform 104 receives data from the plurality of data sources 114, groups the data into a collection of data records, stores the data records within the key/value store 102, and provides information about the collection to the knowledge registry 106. The key/value store 102 can be any unstructured storage facility capable of efficiently storing and retrieving massive amounts of data. Suitable off-the-shelf key/value stores include, but are not limited to, Apache Accumulo™, Apache HBase™, Apache Cassandra, other high performance data storage systems, such as Google Inc.'s BigTable database.

The ingest platform 104 includes a hardware or software component (referred to herein as a "database driver") configured to read and write to/from the key/value store 102. In one exemplary embodiment, the database driver is encapsulated in ingest platform 104 using a generic database interface and/or plugin system, thereby making it easy to change the key/value store implementation and allow multiple key/value stores 102 to be used simultaneously within the ingest platform.

As is known in the art, several unstructured key/value stores (e.g. Apache Cassandra) utilize a so-called "triple-store" architecture wherein data is organized by "tables", "rows", and "columns". A table includes an arbitrary number of rows indexed by a "row key". Row keys are arbitrary fixed-length values chosen by a user. Several triple-store databases, including Apache Accumulo™ as one example, store rows in lexicographical order by key and, therefore, allow range queries to efficiently retrieve multiple rows. A row includes an arbitrary number of columns indexed by a "column name". Typically, each column stores a single data value. Thus, each data value is located by a 3-tuple: a table, a row key, and a column name. It will be appreciated that a triple-store database is particularly well-suited for storing and retrieving collections data records.

Thus, in some embodiments, the key/value store 102 utilizes a triple-store architecture with range query capabilities, and the data ingest platform 104 stores each ingested data record in a separate row. Further, the ingest platform 104 generates row keys such that all rows within a given data collection can be retrieved using a single range query. For time-oriented data (e.g. event data), the data ingest platform may group data records by time and include corresponding lexicographically-encoded timestamps.

In some embodiments, the ingest platform 104 includes one or more syntactic analysis processors or modules which execute one or more parsing techniques ("parsers") to parse one or more different input data formats, such as comma-separated (CSV) or tab-delimited formats widely used for log data. To facilitate the use of many diverse data sources, the ingest platform 104 may include a plug-in system, wherein several different parsers can be supported simultaneously and new parsers can easily be added to the platform. The data ingest engineer 120 can configure an appropriate parser to be used for each of the data sources 114.

As discuss above, the ingest platform 114 may group the (parsed) data records into collections. In some embodiments, each collection generally has the same number of records. In one exemplary embodiment, this fixed size may be configured by the data ingest engineer. In other embodiments, wherein the received data includes log data, the number of records in each collection corresponds to the number of lines in a log file, and thus collection sizes vary. In yet other embodiments, the ingest platform 104 groups time-oriented data records based on a specified time period, such as every minute, every 10 minutes, or every hour. The data ingest platform may allow these time periods (referred to as a "buffer period" hereinbelow) to be configured for each data source and the ingest platform 104 can use the buffer period configurations to perform automatic, period data ingestion. In one exemplary embodiment, the data ingest engineer may configure the time periods via the data ingest platform 104.

Those skilled in the art will appreciate that the size of a data record collection presents certain tradeoffs to the system performance. For example, smaller collection sizes can be processed more quickly, thus providing more real-time insight to the analyst 116. In embodiments, the ingest platform 104 includes a streaming mode wherein data is ingested into the key/value store 102 as soon as it becomes available and thus collections may contain as few as one data record. On the other hand, larger collections, processed less frequently, allow for certain processing and space-wise efficiencies in the system 100.

Various filtering/processing capabilities may be added to the data ingest platform 104. For example, to reduce the volume of data stored in the key/value store 102, the ingest platform 104 may filter or aggregate duplicate or similar data records. As another example, the ingest platform may normalize data before storing in the key/value store, such as converting IP address from a non-standard format to the standard dotted quad form.

After storing a collection of data records into the key/value store 102, the ingest platform 104 provides information about the newly ingested data collection to the knowledge registry 106. Thereby, the knowledge registry 106 is notified that new data is available and, in turn, the new data is accessible the analyst 116. In one exemplary embodiment, the information is provided as metadata; the metadata may include substantially the same attributes as a data collection record 332 used within the knowledge registry 106 and discussed below in conjunction with FIG. 3.

The knowledge registry 106 may be coupled to the ingest platform 104, query executor 108, and query analyzer 110, as shown. Further, the knowledge registry 106 may receive input from, and provide output to a knowledge engineer 118. To reduce data transfer times, the knowledge registry 106 may be implemented as part of the ingest platform 104. The structure and operation of the knowledge registry 106 is discussed in detail below in conjunction with FIG. 2.

The analytics platform 112 may be coupled to the query executor 108 and the query analyzer 110. The analytics platform 112 may include a plurality of applications (e.g. information visualization applications), some of which include a user interface (UI) for use by the analyst 116. The query analyzer 110 may be coupled to the knowledge registry 106, the query executor 108, and the analytics platform 112, as shown. In embodiments, the query analyzer 110 may be part of the analytics platform 112.

In operation, the query analyzer 110 generally receives KQL queries from the analytics platform 112, utilizes the knowledge registry's data store state access service 206 (FIG. 2) to translate query ontology entities into key/value store identifiers (e.g. row keys, column names, and secondary indexes), and issues appropriate communications ("calls") to the query executor 108.

Another function of the query analyzer 110 is to improve (and ideally optimize) query execution times and required processing power compared to execution times and required processing power without such improvements/optimizations. In one embodiment, the knowledge registry 106 tracks which columns have secondary indexes and the query analyzer 110 automatically applies these secondary indexes, when available. In another embodiment, the query analyzer 110 may consult the knowledge registry's usage history service 208 to determine which queries have historically resulted in relatively slow execution and, thus, should be avoided. As another optimization, the query analyzer 110 heuristically reduces (and ideally minimizes) query execution time by selecting a query with a relatively few (and ideally, the fewest) number of operators. As yet another optimization the query analyzer 110 can determine if any data is available for a given time range (e.g. the value specified with a "Time" dimension); if no data is available, the query analyzer 110 can return an empty/null response to the user and not waste system resources (e.g. processing power) invoking the query executor 108. Such "feasibility" or "executability" queries may be performed implicitly, as a form of optimization by the query analyzer 110, or issued explicitly by an analyst 116.

In the exemplary embodiment of FIG. 1, the query executor 108 is coupled to the data ingest platform 104, knowledge registry 106, query analyzer 110, and analytics platform 112. In some embodiments, the query executor 108 may be part of the data ingest platform 104. In alternate embodiments, the query executor 108 is directly coupled to the key/value store 102 and, therefore, may include one or more components (e.g. hardware, software, or a combination of hardware and software) needed to communicate with the key/value store 102. For example, the query executor 108 may include one or more of the database drivers discussed above in conjunction with the ingest platform 104.

The query executor 108 performs two primary functions. First, the query executor 108 is the only system component which is directly coupled to the key/value store 102 to execute database operation thereon (although, in some embodiments, the data ingest platform 104 may write data collections into the data store 102). Thus, it is possible to add, remove, and change the key/value store implementation without requiring any change to the knowledge registry 106, the query analyzer 110, or the analytics platform 112. Second, the query executor 108 provides a query operator application programming interface (API) for use by the query analyzer 110. In one embodiment, the operator-based API includes a separate call for each query operator, such as the operators shown below in TABLE 2. This separation of concerns enables the query analyzer 110 to focus on analyzing and optimizing user queries, while the query executor 108 can focus on providing improved (and ideally optimized) implementations of the various query operators based upon the underlying database storage structure.

If a particular operator is implemented within the key/value store 102, the query executor 108 may delegate some/all of the work thereto. The other operators can be implemented directly within the query executor 108 (i.e. the query executor 108 can post-process data retrieved from the key/value store 102). For example, if the key/value store 102 includes a native count function, the query executor 108 may implement the "COUNT" operator API call merely by delegating to the key/value store. Of course, the "SELECT" operator API call will be delegated to an appropriate key/value store query function. However, if the key/value store 102 does not include a native unique/distinct function, the query executor 108 must include a suitable processor-based implementation of that function. In some embodiments, one or more of the operators is implemented within the data ingest platform 104 and the query executor 108 delegates corresponding API calls thereto.

TABLE 2

| Operator | Inputs | Output |
|---|---|---|
| SELECT | Range of row keys Zero or more value constraints One or more column names | Collection of data records, each record satisfying the value constraints and having the specified column names |
| DISTINCT | One column name Collection of data records | Filtered collection of data records having only one record for each value of the specified column name |
| COUNT | Grouping specifier (e.g. time or column values) Collection of data records | Histogram based on grouping specifier. If time is used, various bin sizes can be used (e.g. hourly, daily, weekly) |
| DIFF | Two histograms resulting, each resulting from a COUNT operator | Difference in the two histograms over the corresponding two time ranges |

After executing the requested operation, the query executor 108 returns a resulting data collection (the "results") to the query analyzer 110 or directly to the analytics platform 112. Before doing so, the query executor 108 may perform a "reverse mapping" whereby the results are converted from native key/value store column names and data types to the corresponding query dimension names and data types. As discussed below in conjunction with FIG. 3, the knowledge registry 300 may associate a data type with each ontology dimension 312 and/or field 324, and, therefore, the query executor 108 can retrieve this information (via the data store state access service 200) to convert from native data types to normalized ontology-based data types.

In a particular embodiment, executing a query may require retrieving data from multiple key/value stores. Here, the CIM may include information regarding how to access one or more key value stores (referred to hereinbelow as "data store access information"), such as an IP address, a network port, and a database name for each key/value store. Further, the CIM may associate each data collection (ingested by the data ingest platform 104) with one more key/value store. During query processing, the query executor 108 can use the data store access information to retrieve data from the respective stores and combine ("join") the results data as needed using any suitable techniques known in the art, including any "join" techniques common used in relational databases.

It should be appreciated that various analytics system components 104-112 of the can be combined and/or further partitioned and therefore the system shown in FIG. 1 is merely one exemplary embodiment.

Figure 2:
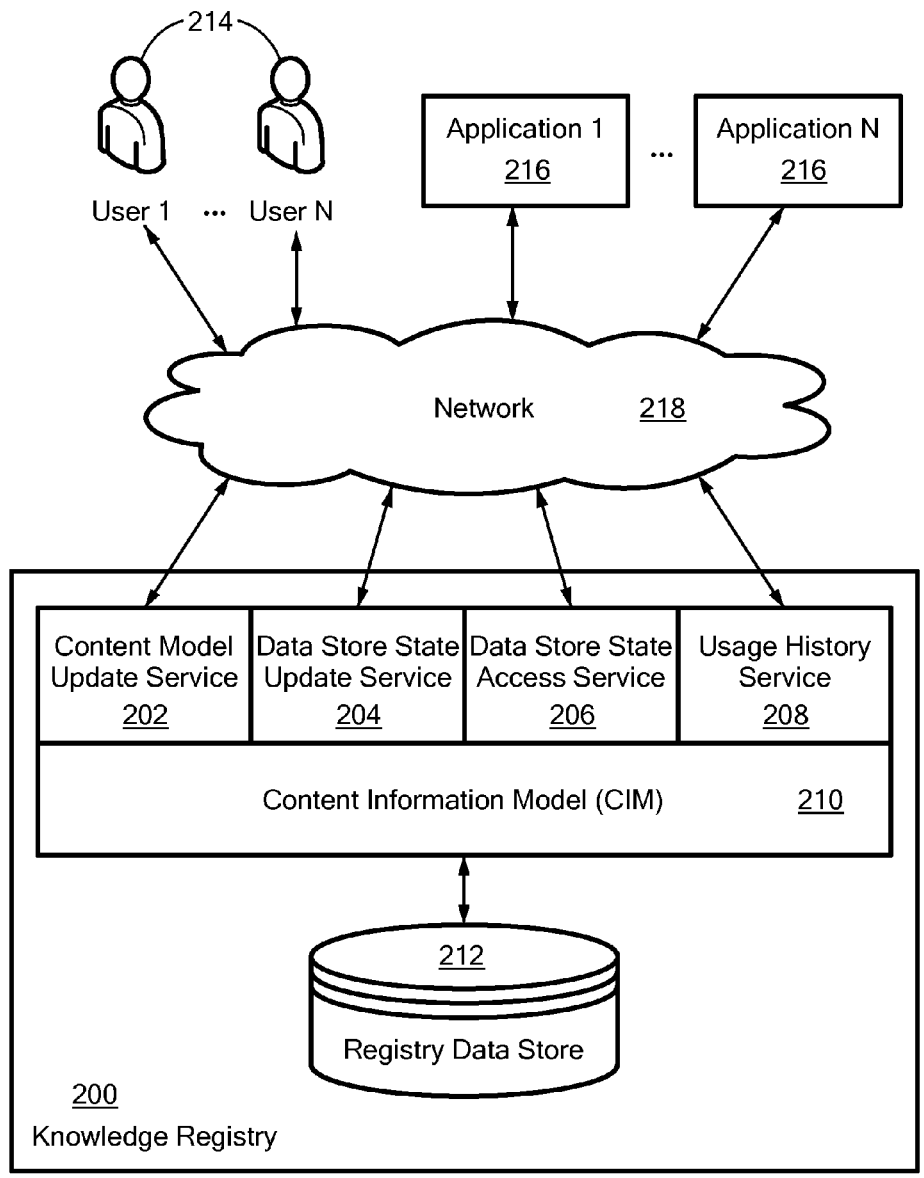
FIG. 2 is a block diagram of an exemplary knowledge registry for use within the analytics system of FIG. 1.

Referring now to FIG. 2, an exemplary knowledge registry 200 may be the same as or similar to the knowledge registry 106 in FIG. 1. The knowledge registry 200 includes a Content Information Model (CIM) update service 202, a data store state update service 204, a data store state access service 206, a usage history service 208, a CIM 210, and a registry data store 212. A plurality of users 214 and/or applications 216 may access the various services 202-208 via a network 218, which may be a local-area network (LAN), wide-area network (WAN) such as the Internet, or any other suitable type of computer network. The applications 216 may include a data ingest platform 104, a query executor 108, a query analyzer 110, and/or an analytics platform 112 (FIG. 1). The users 214 may include an analyst 116, a knowledge engineer 118, and/ or a data ingest engineer 120 (FIG. 1), any of whom may interact with the knowledge registry 200 directly via the network 218, or indirectly via one of the applications 216.

Those skilled in the art will appreciate that the knowledge registry 200 can be implemented and deployed using a variety of software, hardware, and network architectures. In one embodiment, the knowledge registry 200 is a monolithic software application that implements the several services 202-208, the CIM 210, and the registry data store 212. In another embodiment, the registry data store 212 is a standalone database management system. In yet another embodiment, each of the services is a separate software application, coupled to the CIM 210 and the registry data store 212. Further, multiple instances of the knowledge registry 200 may execute concurrently on one or more physical/virtual computing environments. In one embodiment, the services 202-208 include Web Service APIs, responsive to one or more request/response content-types, such as JSON and XML. The services 202-208 may include access controls, user authentication, and/or a data encryption.

Although the operation of the knowledge registry services 202-208 will be discussed further below in conjunction with FIG. 5, a brief overview is now given. The content model update service 202 is generally used by the knowledge engineer 118 (FIG. 1) to update the ontology information stored within the registry data store 212. The data store state update service 204 is used by the data ingest platform 104 to update data collection metadata stored within the registry data store 212. The data store state access service 206 is used by the query analyzer 110 to determine the location and availability of data requested by the analyst 116. The data store state access service 206 may also be used by the query executor 108 to perform a "reverse mapping", as discussed further below. The usage history service 208 is used by the query analyzer 110 to retrieve historical query execution timing information, which is also stored within the registry data store 212. The usage history 208 is also used by the query analyzer 110 and/or query executor 108 to store new query execution timing information.

Figure 3:
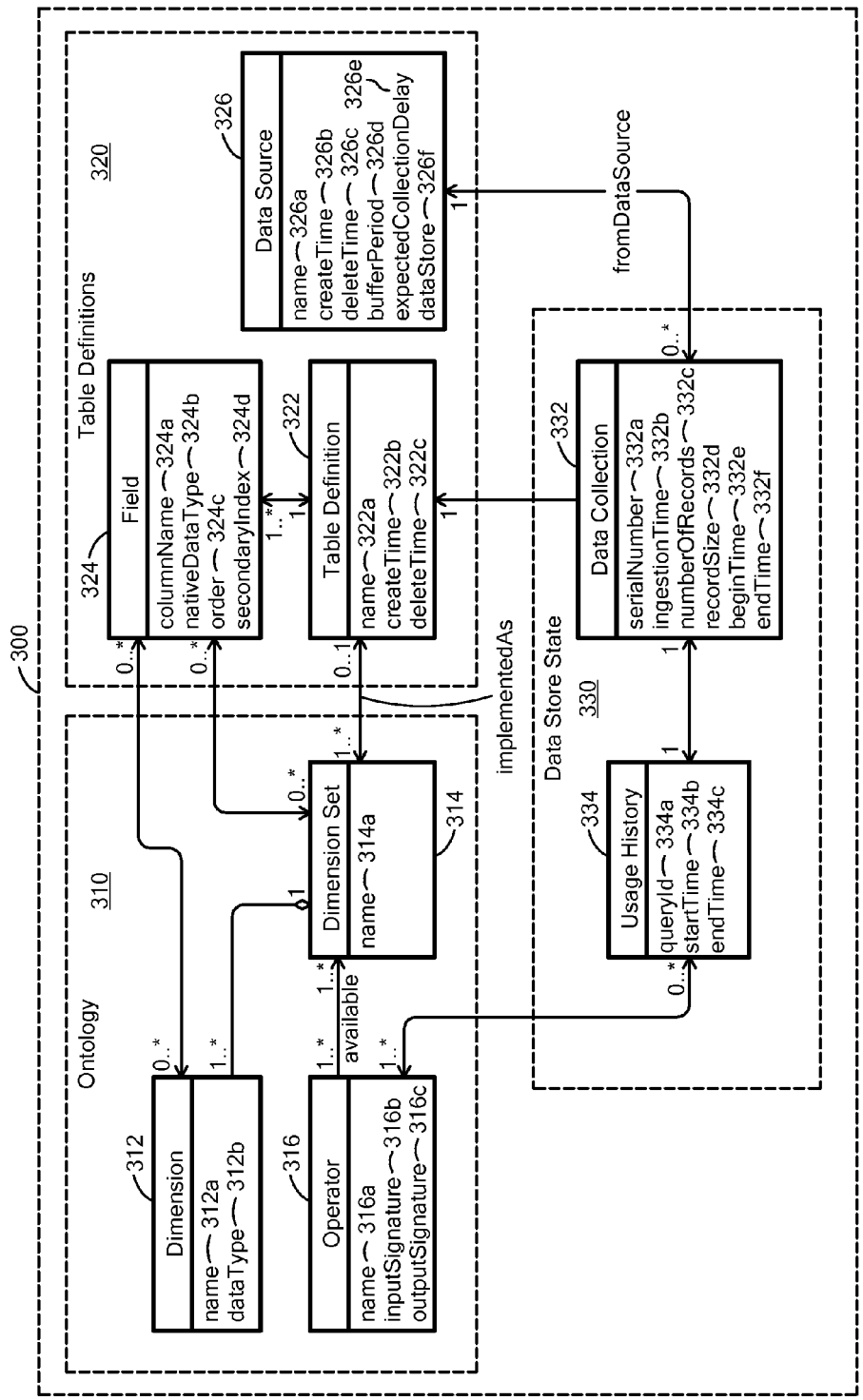
FIG. 3 is a diagram of an exemplary Content Information Model (CIM) for use within the knowledge registry of FIG. 2.

The CIM 210 is a data model which describes a mapping between one or more ontologies and data stored in key/value store 210. The CIM 210 comprises executable code, configuration data, and/or user data which may be included within the various services 202-208 and/or stored within the registry data store 212. For example, the CIM 210 includes a schema (such as shown in FIG. 3) used within the registry data store 212 and software modules which encapsulates the various schema entities to provide a record-based API to the knowledge registry services 202-208. As another example, the ontology portion 310 (FIG. 3) of the CIM may be described using an ontology language, such as the Web Ontology Language (OWL), stored within the registry data store 212. A detailed description of an exemplary CIM is presented below in conjunction with FIG. 3.

The registry data store 212 stores various information used by the services 202-208. The store 212 may include, or be coupled to, a non-volatile memory, such as a solid-state disk (SSD) or a magnetic hard disk (HD). In one embodiment, the registry data store 212 includes a relational database management system (RDBMS), such as MySQL. In another embodiment, the registry data store 212 is an unstructured data store and, therefore, may be included with the key/value store 102. The registry data store 212 can be widely distributed or can be at a single location in a single database.

FIG. 3 shows a Unified Modeling Language (UML)-style class diagram of an exemplary CIM 300, which may be the same as or similar to CIM 210 in FIG. 2. For convenience of explanation, the exemplary CIM 300 will be discussed hereinbelow with reference to three discrete portions: an ontology portion 310, a table definitions portion 320, and a data store state portion 330. Each portion includes one or more "entities" (typified by entity 312) which are abstract data models that may be realized as database tables, one or more data rows/records within a database, and/or one or more software modules. As shown in FIG. 3, an entity may be in communication with or otherwise coupled ("associated") to one or more other entities.

The ontology portion 310 describes one or more ontologies used within the knowledge registry 200 (FIG. 2). Thus, the ontology portion 310 determines how knowledge is represented within the knowledge registry 200. The ontology portion 310 can be domain-specific; that is, the data model entities therein may vary based upon the type of data that is stored in the key/value store 102 and the corresponding ontologies. In particular, entities that describe domain-specific knowledge concepts may be added to the CIM 300 and, therefore, it should be appreciated that the exemplary ontology portion 310 shown in FIG. 3 is merely a generalized, baseline data model which can be readily extended.

The exemplary ontology portion 310 includes one or more dimensions 312, one or more dimension sets 314, and one or more operators 316. A dimension 312 includes a name 312a and a data type 312b. The name 312a is an arbitrary ontological identifier provided by the knowledge engineer 118, such as "IPAddress" or "Time". The data type 312b indicates a normalized data type and format in which corresponding result data is encoded. The data type 312b may be a C-style format string, an enumerated value, or any other suitable identifier. As discussed further below, the dimension data types 312b and field data type 324b may be collectively used by the query executor 108 to map native data types/formats to normalized ontology data types/formats.

In some embodiments, a dimension 312 may be comprised of one or more other dimensions (i.e. dimensions may bay be associated with other dimensions). For example, in the cyber security domain, the knowledge engineer 118 may generate a "URL" dimension (referring to Uniform Resource Locators) that is comprised of an "IPAddress" dimension and a "Port" dimension. Such decomposition capability allows the knowledge engineer 118 to map a complex ontology entity to multiple "low level" columns in the key/value store.

A dimension set 314 represents a grouping of related ontology entities and, thus, includes one or more dimensions 312. Dimensions are generally unordered within a dimension set; in contrast, fields are generally ordered within a table definition, as discussed below. Dimension sets 314 include a name 314a (e.g. "WebRequest") which may be provided by the knowledge engineer 118. Dimension names 312a and/or dimension set names 314a may be unique within the knowledge registry, allowing them to be used as primary identifiers. In some embodiments, a dimension set 314 is associated with one or more operators 316 such that the knowledge registry services can determine which operators are available for a given dimension set. The specific dimensions 312 and dimension sets 314 available within the knowledge registry are configured by the knowledge engineer 118, via the content model update service 202.

It should be known that the meaning of the various dimension sets 314 relates to the specific ontology being modeled within the CIM 300. For example, if event data is being modeled (i.e. the ontology is an event-based ontology), each configured dimension set 314 may represent a different event type. Thus, in such a domain-specific embodiment, a "dimension set" may be referred to as an "event type" or the like.

An operator 316 includes a name 316a, an input signature 316b, and an output signature 316c, the combination of which may be unique within the knowledge registry 200. Example operator names 316a are shown above in TABLE 2. An operator 316 represents either an opaque operation to retrieve a data collection (e.g. "SELECT") or an opaque transformation on a data collection. Accordingly, the input signature 316b and the output signature 316c specify the ontology entities expected to appear in the input collections and output collections, respectively (for retrieval operations, the "input" collection corresponds to the data retrieved from the key/value store). It should be appreciated that the signatures 316b, 316c can be readily constructed based on the "INPUT" and "OUTPUT" sections of a KQL query. In some embodiments, the ontology portion 310 of the CIM may be provided by the knowledge engineer 118 (via the content model update service 202) using OWL.

The table definitions portion 320 represents a mapping between an ontology used within knowledge registry and one or more table structures within the key/value store 102. The exemplary table definitions portion 320 shown in FIG. 3 includes one or more table definitions 322, one or more fields 324, and one or more data sources 325. A data source 326 represents one or more of the data sources 114 (FIG. 1) from which the key/value store 102 is populated. A data source 326 includes a name 326a, a create timestamp 326b that indicates the date-time when the data source was added to the knowledge registry, and a delete timestamp that indicates the date-time the data source was soft deleted from the knowledge registry. The data source names 326a may be unique with the knowledge registry 200. A data source 326 may include additional attributes used by the data ingest platform 104 to perform automatic, period data ingestion such as a buffer period 326d and an expected collection delay 326e. A table definition 322 includes a unique name 322a, a create timestamp 322b indicating when the definition was added to the knowledge registry, and a delete timestamp 322c indicating when the definition was "soft" deleted (i.e. removed) from the knowledge registry. Data sources 326 may be generated, updated, and soft deleted by the data ingest engineer 120 via the data ingest platform 104, which uses the knowledge registry's data store state update service 204. The data ingest engineer 120 provides a unique name 326a and other required attributes.

In some embodiments, a data source 326 further includes data store access information 326f. In one embodiment, the data store access information comprises an IP address, a network port, and a database name and is used to configure a database driver within the query executor 108 and/or data ingest platform 104.

A table definition 324 includes one or more fields 324, each of which includes a column name 324a that corresponds to a column name within the key/value store 102. A table definition 322 may be associated with one or more dimension sets 314 such that the knowledge registry services 202-208 (FIG. 2) can determine which table definitions implement a given dimension set. In addition, one or more of the fields 324 may be associated with an ontology entity (i.e. a dimension 312 or a dimension set 314) such that, given a list of ontology entities, the services 202-208 can determine the names of columns within the key/value store that contain relevant data. As discussed above, a dimension 312 may comprise other dimensions, and thus may be associated with a plurality of fields 324; in other words, a discrete ontology entity may span multiple key/value store columns.

In some embodiments, a field 324 further includes a native data type which indicates the type and/or format of data stored within the corresponding key/value store columns. The native data type 324b can be used by the query executor 108 (FIG. 1) to "reverse map" a data collection retrieved from the key/value store 102 from a native type/format to a normalized ontological data type/format associated with the ontology.

A field 324 may further include an order value 324c, which is used by the data ingest platform 104 to interpret ordered data from a given data source. In some embodiments, a data source 326 may also be associated with a table definition 322 and, therefore, using the field ordering, may periodically, automatically receive data from the data source 114 and populate the key/value store 102 therewith.

In a particular embodiment, a field 324 further includes secondary index information 324d. In one embodiment, the secondary index information 324d is a simple flag (i.e. boolean value) that indicates whether the key/value store 102 includes a secondary index on the corresponding column. In other embodiments, the secondary index information 324d may be a string which indicates the name of the index, and the information may be used by the query executor 108 to construct an appropriate key/value store query. In most embodiments, the query analyzer 110 and/or query executor 108 uses the secondary index information 324d to generate queries which take less time and/or power to execute.

It should now be appreciated that, in one aspect, the table definitions portion 320 of the CIM, in association with the ontology portion 310 of the CIM, defines a mapping between a knowledge-based ontology and an unstructured data store. Moreover, a table definition 322 and associated fields 324 define how data is stored within the key/value store 102, thus imparting a "meta structure" onto unstructured data stores.

Table definitions 322, fields 324, and their associations with the ontology portion 310 may be assigned by a knowledge engineer 118 via the data ingest platform 104, which uses one or more of the knowledge registry service, and stored in the registry data store 212.

The data store state portion 330 of the CIM represents the contents of the key/value store 102; that is, it tracks which data presently exists in the key/value store 102 and can be used to answer queries from an analyst. The data store state portion 330 may include one or more data collection records 332, each of which represents a collection of data records ingested from a data source 114 into the key/value store 102. As discussed above, in some embodiments, an ingested data collection is stored as a plurality of rows within the key/value store 102. A data collection record 332 may include a serial number 322a which uniquely identifies the collection with the knowledge registry 200, an ingestion timestamp 322b that indicates the time the data was ingested into the key/value store 102, the number of records 322c in the collection, and the size of each record 322d. A data collection also includes one or more attributes to locate the corresponding data records (i.e. rows) within the key/value store, for example a begin timestamp 322e and an end timestamp 322f, which can be used by the data ingest platform 104 to generate the start/end keys for a range of rows. A data collection record 332 is associated with a table definition 322, thereby allowing the knowledge registry services 202-208 to locate rows within the key/value store that contain data corresponding to a given ontology entities. For reference purposes, a data collection record 332 may also be associated with a data source 326.

The data store state portion 330 may also include one or more usage history records 334, each of which corresponds to a query executed by an analyst 112. In one embodiment, a usage history record 334 tracks operations performed by the query executor 108 (FIG. 1), and thus may be associated with an operator 316, as shown. A usage history record 334 may include a query identifier 334a, a start timestamp 334b indicating the time the query execution started, an end timestamp 334c indicating the time the query execution completed. The query executor 108 may generate usage history records 334—via the usage history service 208—when a operation is completed. As discussed above, a KQL query may result in multiple operations, and thus to track the overall execution time of a KQL query, a common query identifier 334a can be used across several usage history records 334.

It should now be appreciated that the knowledge registry 200, in particular the services 202-208 and the CIM 210, are entirely isolated from the key/value store 102, and therefore the database structure used within the key/value store 102 can be changed independently of the data models used within the knowledge registry 200, and vice-versa. More specifically, dimensions 312, dimension sets 314, and operators 316 are implementation independent such that the data ingest platform 104 has the freedom to store data in the key/value store 102 using any structure it chooses so long as the mappings are stored in the knowledge registry 106.

Figure 4:
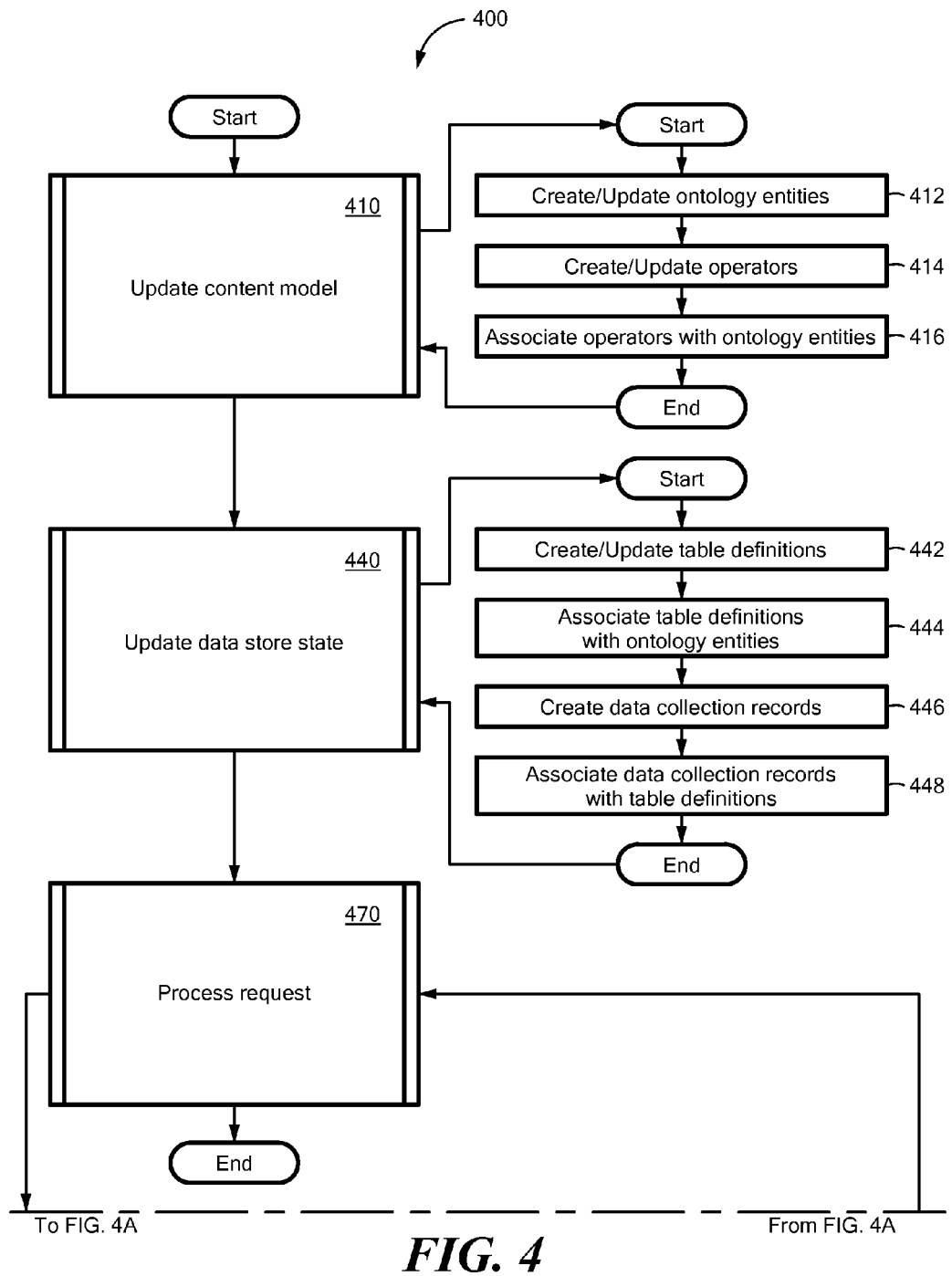
FIGS. 4 and 4A are a flowchart showing an exemplary method for use within the knowledge registry of FIG. 2.
Figure 4A:
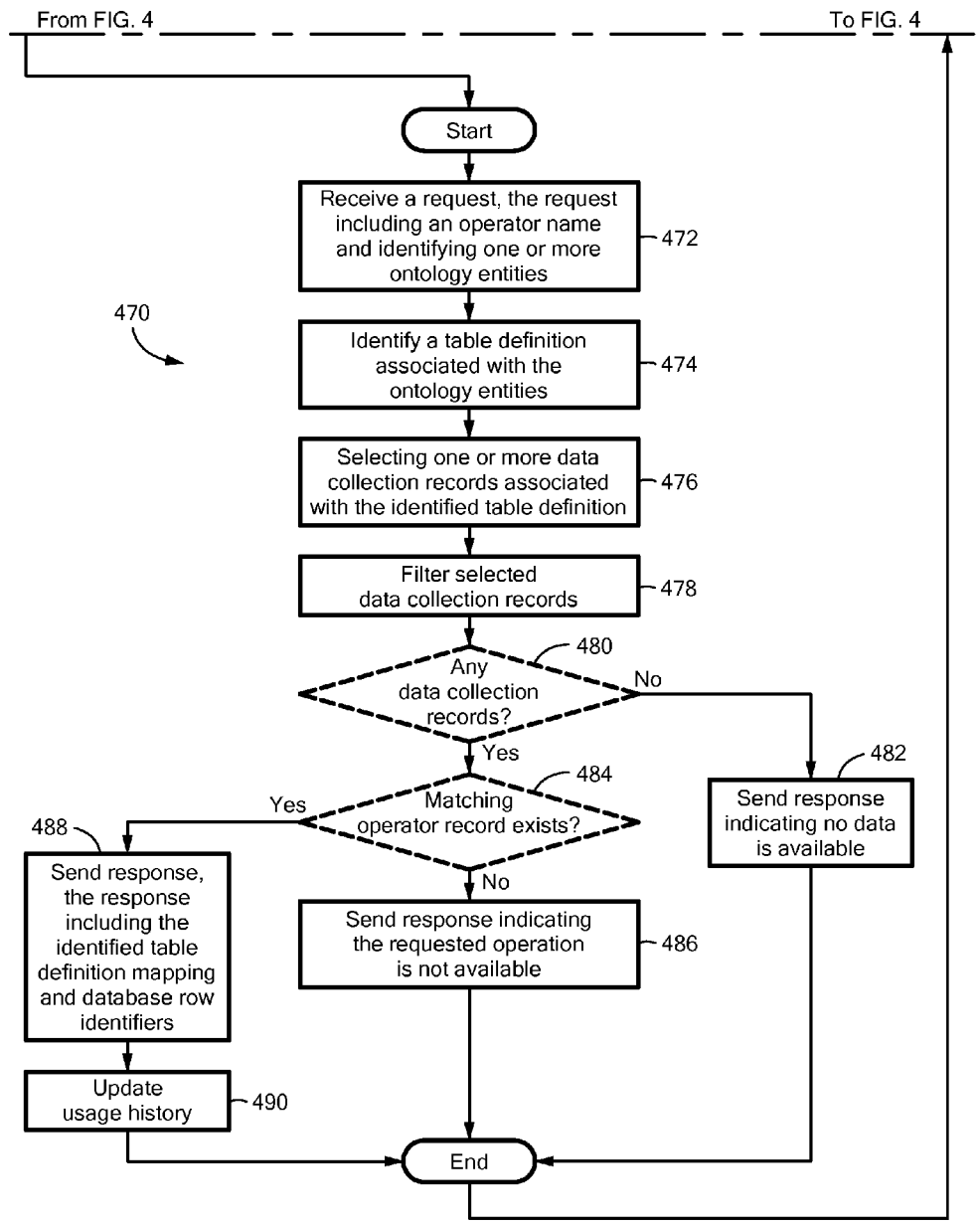

Referring now to FIGS. 4 and 4A, an exemplary method 400 for use in a knowledge registry, such as knowledge registry 200 (FIG. 2), is shown. The method 400 comprises three sub-methods: updating the content model 410, updating data store state 440, and processing a query 470.

Figure 5:
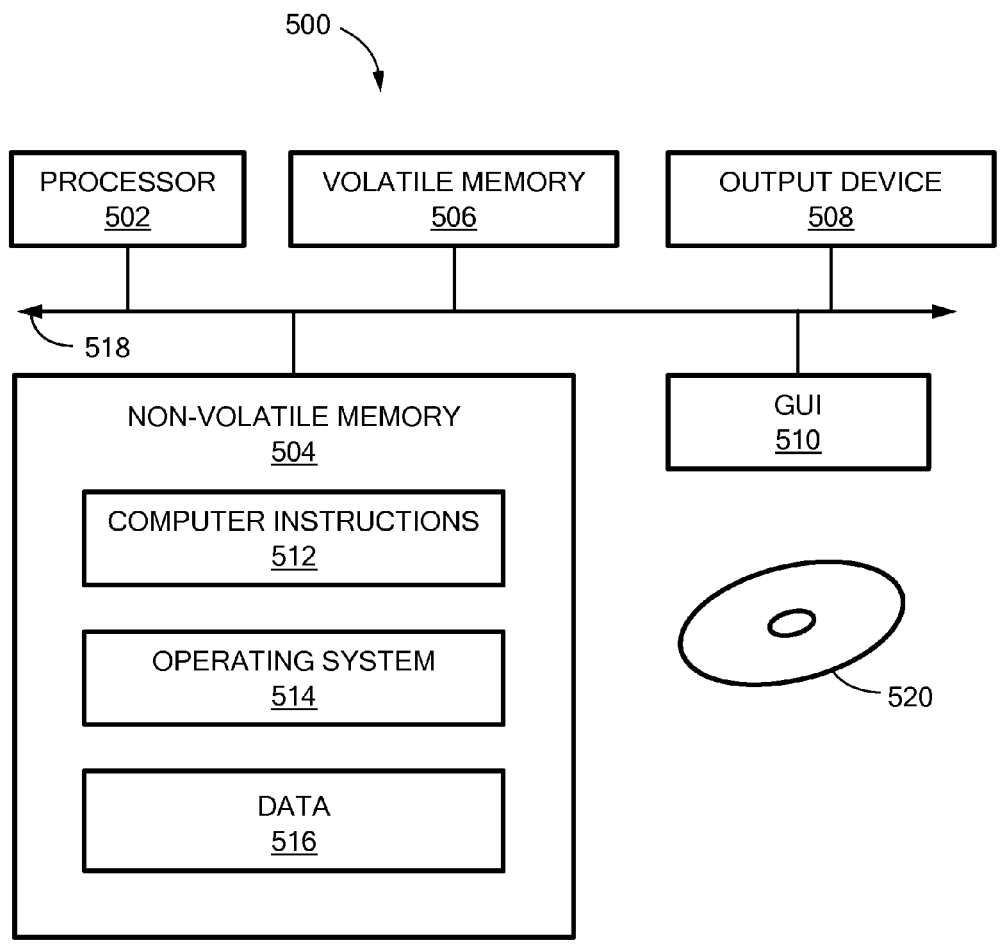
FIG. 5 is a schematic representation of an exemplary computer for use with the systems of FIGS. 1 and 2.

It should be appreciated that FIGS. 4 and 4A show a flowchart corresponding to the below contemplated technique which may be implemented in a computer system 500 (FIG. 5). Rectangular elements (typified by element 412), herein denoted "processing blocks," represent computer software instructions or groups of instructions. Rectangular elements having double vertical lines (typified by element 410), herein denoted "sub-methods," represent a logical and/or physical grouping of processing blocks. Diamond shaped elements (typified by element 478), herein denoted "decision blocks," represent computer software instructions, or groups of instructions, which affect the execution of the computer software instructions represented by the processing blocks. Alternatively, the processing blocks, sub-methods, and decision blocks represent steps performed by functionally equivalent circuits such as a digital signal processor circuit or an application specific integrated circuit (ASIC). The flowchart does not depict the syntax of any particular programming language, but rather illustrates the functional information one of ordinary skill in the art requires to fabricate circuits or to generate computer software to perform the processing required of the particular apparatus. It should be noted that many routine program elements, such as initialization of loops and variables and the use of temporary variables are not shown.

It will be appreciated by those of ordinary skill in the art that unless otherwise indicated herein, the particular sequence of blocks described is illustrative only and can be varied without departing from the spirit of the systems and methods sought to be protected herein. Thus, unless otherwise stated the blocks described below are unordered meaning that, when possible, the steps can be performed in any convenient or desirable order. In particular, the sub-methods 410, 440, 470 can be executed in any order and one or more sub-method may be executed in parallel; an ordered, serial method is shown in FIG. 5 merely for convenience of explanation.

In general, the exemplary sub-method 410 generates and/or updates certain portions of the CIM 210 within the knowledge registry 200. More specifically, the sub-method 410 generates dimension 312, dimension set 314, and/or operator 316 records within the registry data store 212 and/or updates existing such records. The sub-method 410 may be implemented within the content model update service 202, used by a knowledge engineer 118.

The sub-method 410 begins at block 412, where one or more ontology entities (i.e. dimensions 312 or dimension sets 314) are generated/updated. Next, at block 414, one or more operators 316 are generated/updated. Finally, at block 416, the generated/updated ontology entities are associated with one or more operators and, similarly, the generated/updated operators are associated with one or more ontology entities; the nature of these associations is discussed further above in conjunction with FIG. 3.

The exemplary sub-method 440 generates/updates table definition 322, field 324, data source 326, and data collection records 332 within CIM 210. The sub-method 440 may be implemented within the data store state update service 204, used by a data ingest engineer 120.

The sub-method 440 begins at block 442, where one or more table definitions 322 records are generated/updated. If a column is added to the key/value store, block 442 includes generating one or more associated fields 324. If a column is removed from the key/value store, block 442 includes deleting/disassociating one or more fields 324.

Next, at block 444, one or more table definitions (typically the table definitions generated/updated in processing block 442) are mapped to ontology entities 312, 314 as follows. First, each table definition 322 is associated to a dimension set 312, indicating that the associated data collections—and corresponding rows—comprise data related to the dimension set ontology. Second, one or more of the fields 324 within the table definition is associated to a dimension 312, indicating that the corresponding column name stores data having that dimension.

At processing block 446, one or more data collection record 332 is generated within the registry data store 212, indicating that new data has been ingested into the key/value store 102. In the final block 448 of exemplary sub-method 440, each of the newly generated data collection records 332 is associated with a table definition 322.

It should now be appreciated that processing blocks 442 and 444 generate a mapping between a table definition and an ontology, and the processing blocks 446 and 448 associate the table definition to one or more identified rows within the key/value store 212. Typically, the blocks 446 and 448 will be repeated more frequently compared to the blocks 442 and 444.

The exemplary sub-method 470 (FIG. 4A) processes an ontology-based query, such as a KQL query. The sub-method 470 may be implemented within the data store state access service 206 (FIG. 2), used by an analyst 116 via an analytics platform 112 (FIG. 1) and/or a query analyzer 110. The sub-method 470 begins at block 472, where a query is received, the query having an operator name and identifying one or more ontology entities. In an embodiment, the query ontology entities includes an operator name, a dimension set identifier, one or more input dimension identifiers, and one or more output dimension identifiers. Here, the query may correspond to a single operator from a KQL query. Using the exemplary KQL query from TABLE 1, the data store state access service 206 may receive an ontology-based query having the dimension set identifier "WebRequest", the operator name "SELECT", input dimensions "Server:DomainName" and "Time", and output dimension "ALL_DIMENSIONS". The query analyzer 110 may receive a full KQL query from an analyst 116 and iterate over the operations therein, invoking the sub-method 470 once for each such operation.

Next, at block 474, at least one table definition 322 is identified based upon the received query. In one embodiment, where the query includes a dimension set identifier, the data store state access service 206 first retrieves a dimension set 314 based upon the query dimension set identifier and then finds a table definition 322 associated with the identified dimensions set 314. As discussed above, the table definition 322—and associated fields 324—defines a mapping between column names used in the key/value store 102 and one or more ontology entities.

Next, at block 476, one or more data collection records 330 are selected. In one embodiment, all data collection records 330 associated with the identified table definition 322 are selected.

Next, at block 478, the selected data collection records may be filtered. In some embodiments, the key/value store includes event data and one or more of the data collection records includes a range of event times. Herein, the selected data collection records may be filtered based on a time range included with the query (e.g. the "Time" value constraint shown in TABLE 1); data collection records 330 that have a begin timestamp 332e or an end timestamp 332f outside the time range are excluded. For example, referring back to the query in TABLE 1, only events which occurred on or after 2012-08-11 03:00:00 UTC and on or before 2012-08-12 03:00:00 UTC are selected (in TABLE 1, the time zone UTC is implied).

Next, decision block 480 may be performed. If all of the data collection records are excluded by the filtering, a response is sent (at block 482) indicating that no data is available to satisfy the query. Such a "feasibility" check is provided for efficiency, allowing the system 100 (FIG. 1) to avoid unnecessary, expensive database queries. If any data collection records remain, the sub-method 470 continues as follows.

In embodiments where the received query includes an operator name, decision block 484 may be performed next. Herein, it is determined whether an operator 316 exists having a name 316a matching the query operator name. If no such operator 316 exists, a response is sent (at block 486) indicating that the requested operation is not available.

Otherwise, at block 488, a response is sent which includes the identified table definition column mapping and row identifies, which are based upon the selected data collection records. In one embodiment, the row identifiers comprise one or more time ranges (i.e. a begin timestamp and an end timestamp) corresponding to the time ranges in the selected data collection records; overlapping and contiguous time ranges may be combined to reduce the size of the response.

Finally, at block 490, a usage history record 334 may be stored and associated with the operator matched in block 484.

FIG. 5 shows an exemplary computer 500 that can perform at least part of the processing described herein. The computer 500 includes a processor 502, a volatile memory 504, a non-volatile memory 506 (e.g., hard disk), an output device 508 and a graphical user interface (GUI) 510 (e.g., a mouse, a keyboard, a display, for example). The non-volatile memory 506 stores computer instructions 512, an operating system 514, and data 516, each of which is coupled together by a bus 518. In one example, the computer instructions 512 are executed by the processor 502 out of volatile memory 504. In one embodiment, an article 520 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

All references cited herein are hereby incorporated herein by reference in their entirety.

Having described exemplary embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A method implemented in a computer system comprising a processor and a memory, the method comprising:
    receiving a request, the request identifying one or more ontology entities stored in the memory, the request identifying a time range;
    identifying at least one table definition from the memory, the identified table definition associated with the identified ontology entities, the identified table definition comprising a mapping between one or more of the ontology entities and one or more database column identifiers;
    selecting one or more data collection records from the memory, each selected data collection record associated with the identified table definition, each data collection record comprising one or more database row identifiers, each database row having one or more columns each row column corresponding to one of the table definition columns, wherein at least one of the database row identifiers comprises a timestamp and a second timestamp;
    filtering the selected data collection records based upon the time range and the data collection row identifier timestamps; and returning a response, the response including the identified table definition mapping and the database row identifiers from the selected data collection records.

2. The method of claim 1, wherein the request further comprises at least one operator name, the method further comprising:
   determining if a matching operator record exists in the memory, the matching operator record having a name matching the operator name and being associated with the identified ontology entities,
   wherein the response indicates the existence of the matching operator record.

3. The method of claim 1 wherein at least one of the table definitions includes one or more secondary indexes, wherein the response further includes any secondary indexes included within the identified table definition.

4. The method of claim 2 further comprising:
   identifying, from among a plurality of operator records stored in the memory, at least two operator records having a name matching the operator name and being associated with the identified ontology entities; and
   selecting one of the two identified operator records based upon historical usage information stored in the memory.

5. The method of claim 1 further comprising retrieving one or more data records from a database, wherein the location of the data records in the database is based upon the table definition mapping and the database row identifiers included within the response.

6. The method of claim 5 wherein the database comprises a key/value store.

7. The method of claim 5 wherein the database comprises event data and the request further comprises an event type.

8. A method implemented in a computer system comprising a processor and a memory, the method comprising:
   storing, in the memory, one or more ontology entities associated with an ontology;
   storing, in the memory, one or more table definitions, each table definition comprising a mapping between one or more of the ontology entities and one or more database column identifiers; and
   storing, in the memory, one or more data collection records, each data collection record associated with one of the stored table definitions, and each data collection record comprising one or more database row identifiers, each data collection record comprising one or more database row identifiers, each database row having one or more columns, each row column corresponding to one of the table definition columns, wherein at least one of the database row identifiers comprises a first timestamp and a second timestamp.

9. The method of claim 8 further comprising:
   receiving a request, the request identifying one or more of the stored ontology entities;
   identifying at least one table demotion, from the memory, associated with the identified ontology entities;
   selecting one or more data collection records, from the memory, associated with the identified table definition; and
   returning a response, the response including the identified table definition mapping and the database row identifiers from the selected data collection records.

10. The method of claim 9 wherein the request further comprises at least one operator name, the method further comprising:
    storing, in the memory, one or more operator records, each operator record having an name and being associated with one or more of the stored ontology entities; and
    determining if a matching operator record exists in the memory, the matching operator record having a name matching the operator name and being associated with the identified ontology entities,
    wherein the response indicates the existence of the matching operator record.

11. The method of claim 9 wherein the request further comprises a time range, the method further comprising filtering the selected data collection records based upon the time range and the data collection row identifier timestamps.

12. The method of claim 9 wherein at least one of the table definitions includes one or more secondary indexes, wherein the response further includes any table definition indexes included within the identified table definition.

13. The method of claim 10 further comprising:
    storing, in the memory, a usage history record associated with the matching operator record, the usage history record comprising a timestamp generally indicating the time required to perform processing associated with the identified operator.

14. The method of claim 13 further comprising:
    identifying, from among the plurality of operator records stored in the memory, at least two operator records having a name matching the operator name and being associated with the identified ontology entities; and
    selecting one of the two identified operator records based upon historical usage information stored in the memory.

15. The method of claim 10 further comprising retrieving one or more data records from a database, wherein the location of the data records in the database is based upon the table definition mapping and the database row identifiers included within the response.

16. The method of claim 15 wherein the database comprises a key/value store.

17. A method comprising:
    importing data from an unstructured data source into a first database comprising a key/value store;
    determining a table definition record associated with the unstructured data source, the table definition record describing a column schema within the first database used to store the imported data;
    generating a data collection record having information to locate the imported data within the key/value store, the data collection record associated with the determined table definition;
    storing the data collection record to a second database;
    receiving a request for data expressed using ontology entities;
    querying the second database to identify one or more table definition records that satisfies the ontological query;
    querying data collection records within the second database to determine if the data request is feasible;
    returning a response indicating if the data request is feasible; and
    if the data request is feasible, retrieving data from the first database using the data location information included within the queried data collection records.

18. The method of claim 17 wherein the second databases comprises a relational database.

19. The method of claim 17 wherein the unstructured data source is a log file.

* * * * *